(12) United States Patent
Kim et al.

(10) Patent No.: US 11,653,082 B2
(45) Date of Patent: May 16, 2023

(54) METHOD AND DEVICE FOR SYNCHRONIZING BETWEEN ROTARY LIDAR AND CAMERA

(71) Applicant: MOBILTECH, Seoul (KR)

(72) Inventors: Jae Seung Kim, Seoul (KR); Hyoung Gon Yoo, Suwon-si (KR); Gil Hyeon Kim, Seongnam-si (KR); Maxime Coret, Seoul (KR)

(73) Assignee: MOBILTECH, Seoul (KR)

( * ) Notice: Subject to any disclaimer, the term of this patent is extended or adjusted under 35 U.S.C. 154(b) by 0 days.

(21) Appl. No.: 17/538,345

(22) Filed: Nov. 30, 2021

(65) Prior Publication Data

US 2023/0098271 A1 Mar. 30, 2023

(30) Foreign Application Priority Data

Sep. 30, 2021 (KR) .................. 10-2021-0129754

(51) Int. Cl.
*H04N 23/60* (2023.01)
*G01S 17/86* (2020.01)
*H04N 23/90* (2023.01)
*G01S 17/42* (2006.01)
*G01S 17/931* (2020.01)

(52) U.S. Cl.
CPC .............. *H04N 23/60* (2023.01); *G01S 17/42* (2013.01); *G01S 17/86* (2020.01); *H04N 23/90* (2023.01); *G01S 17/931* (2020.01)

(58) Field of Classification Search
CPC ........ H04N 5/232; H04N 5/247; H04N 23/60; H04N 23/90; G01S 17/42; G01S 17/86; G01S 17/931
See application file for complete search history.

(56) References Cited

U.S. PATENT DOCUMENTS 10,531,075 B1 * 1/2020 Dariush ................. H04N 5/232
2019/0098233 A1 * 3/2019 Gassend ................. G01S 17/42

* cited by examiner

*Primary Examiner* — Nelson D. Hernández Hernández
(74) *Attorney, Agent, or Firm* — Bridgeway IP Law Group, PLLC; Jihun Kim

(57) ABSTRACT

Proposed are a method of synchronizing a rotary LiDAR and a camera, and a device thereof. The synchronization device may include a LiDAR, a camera, and a synchronization control unit. The method of synchronizing a LiDAR and a camera may comprise the steps of: outputting a sample at every predetermined output cycle while rotating, by the LiDAR; deriving a trigger timing that is a time estimated for the LiDAR to rotate from a current position to a trigger target on the basis of the sample, by the synchronization control unit; and outputting a trigger signal to the camera after a time indicated by the trigger timing elapses, by the synchronization control unit. The sample may include a rotation angle indicating the current position of the LiDAR, and the trigger target may indicate a virtual direction in which the center of the angle of view of the LiDAR matches that of the camera.

8 Claims, 10 Drawing Sheets ns of the present invention to a method of synchronizing a rotary LiDAR and a camera, and a device thereof. In more detail, the present invention relates to a method of matching sensing data of a rotary LiDAR with a photographed image of a camera, and a device thereof.

METHOD AND DEVICE FOR SYNCHRONIZING BETWEEN ROTARY LIDAR AND CAMERA

BACKGROUND OF THE INVENTION

Field of the Invention

The present invention relates to a method of synchronizing a rotary LiDAR and a camera, and a device thereof. In more detail, the present invention relates to a method of matching sensing data of a rotary LiDAR with a photographed image of a camera, and a device thereof.

Background of the Related Art

Various types of visual sensors such as LiDAR (Light Detection and Ranging) and cameras are widely used in autonomous vehicle systems to recognize and determine surrounding environments in real-time, and the autonomous vehicle systems operate basically assuming time synchronization between these various visual sensors. Generally, synchronization between visual sensors such as cameras can be accomplished relatively easily by using a device that provides time information quickly like a global positioning system (GPS). However, it is impossible to secure precise synchronization between a rotary LiDAR that acquires surrounding street information while rotating only with time information provided from an external device and a camera that acquires visual information of a specific range at once.

Presently, all LiDARs except solid-state LiDARs are rotary LiDARs. As mentioned above, a method of synchronizing an existing rotary LiDAR and a camera stores time information when the camera captures an image using time information of an external device and time information of three-dimensional data obtained while the LiDAR rotates, and matches and uses the most similar time values among the recorded time information. Although the synchronized data is sufficient to use for general purposes, it is not suitable for being used in algorithms used in autonomous vehicle systems or the like that require precise matching between the LiDAR and the camera. To solve this problem, Karlsruhe Institute of Technology in Germany has solved the time synchronization problem using a method that physically provides a synchronization signal to a camera by installing a hardware switch in a rotary LiDAR. However, this method has a durability problem due to the physical switch.

Inaccurate time synchronization between a rotary LiDAR and a camera generates fundamental errors in data matching, and this may be critical in the operation of visual sensors in autonomous vehicle systems that should guarantee stable results in extremely diverse outdoor environments. There is a problem in that the existing devices and methods thereof have limitations in fundamentally overcoming the disadvantages.

SUMMARY OF THE INVENTION

Therefore, the present invention has been made in view of the above problems, and it is an object of the present invention to provide a method and device for synchronizing a rotary LiDAR and a camera.

The technical problems of the present invention are not limited to the technical problems mentioned above, and unmentioned other technical problems will be clearly understood by those skilled in the art from the following description.

To accomplish the above object, according to one aspect of the present invention, there is provided a LiDAR-camera synchronization device comprising: a LiDAR for outputting a sample while rotating; a synchronization control unit for deriving a trigger timing that is a time estimated for the LiDAR to rotate from a current position to a trigger target on the basis of the sample, and outputting a trigger signal to the camera after a time indicated by the trigger timing elapses; and a camera that begins photographing when the trigger signal is received.

According to another aspect of the present invention, there is provided a method of synchronizing a LiDAR and a camera, the method comprising the steps of: outputting a sample at every predetermined output cycle while rotating, by the LiDAR; deriving a trigger timing that is a time estimated for the LiDAR to rotate from a current position to a trigger target on the basis of the sample, by the synchronization control unit; and outputting a trigger signal to the camera after a time indicated by the trigger timing elapses, by the synchronization control unit.

DESCRIPTION OF SYMBOLS

Figure 1:
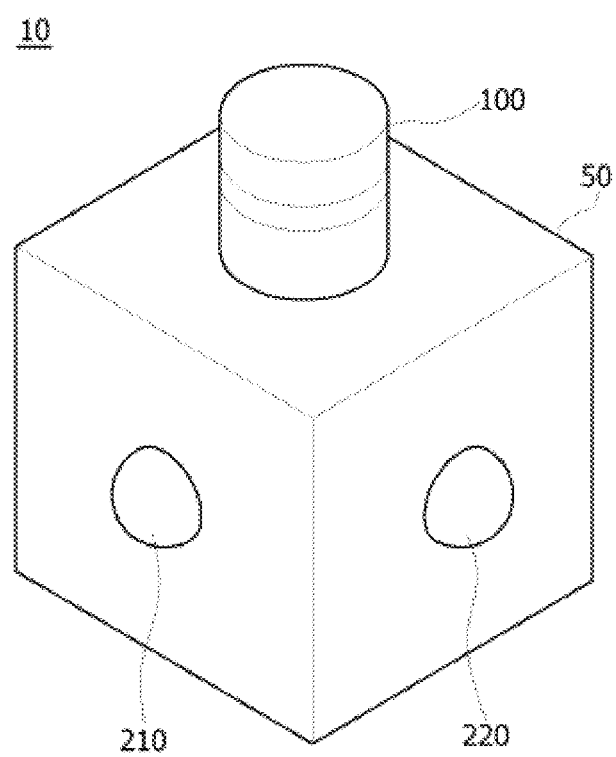
FIG. 1 is a perspective view showing a LiDAR-camera synchronization device according to an embodiment of the present invention.

10: LiDAR-camera synchronization device
100: LiDAR
200: Camera
500: Synchronization control unit

DETAILED DESCRIPTION OF THE PREFERRED EMBODIMENT

Hereinafter, the preferred embodiments of the present invention will be described with reference to the accompanying drawings. The advantages and features of the present invention, and a method for achieving them will become apparent with reference to the embodiments described below in detail in conjunction with the accompanying drawings. However, the present invention is not limited to the embodiments disclosed below, but may be implemented in various forms different from each other. These embodiments are provided only to make the disclosure of the present invention complete and to fully inform those skilled in the art of the scope of the present invention, and the present invention is only defined by the scope of the claims. Like reference numerals refer to like elements throughout the specification.

Unless defined otherwise, all the terms (including technical and scientific terms) used in this specification may be used as a meaning that can be commonly understood by those skilled in the art. In addition, the terms defined in a commonly used dictionary are not interpreted ideally or excessively unless explicitly and specifically defined.

Figure 2:
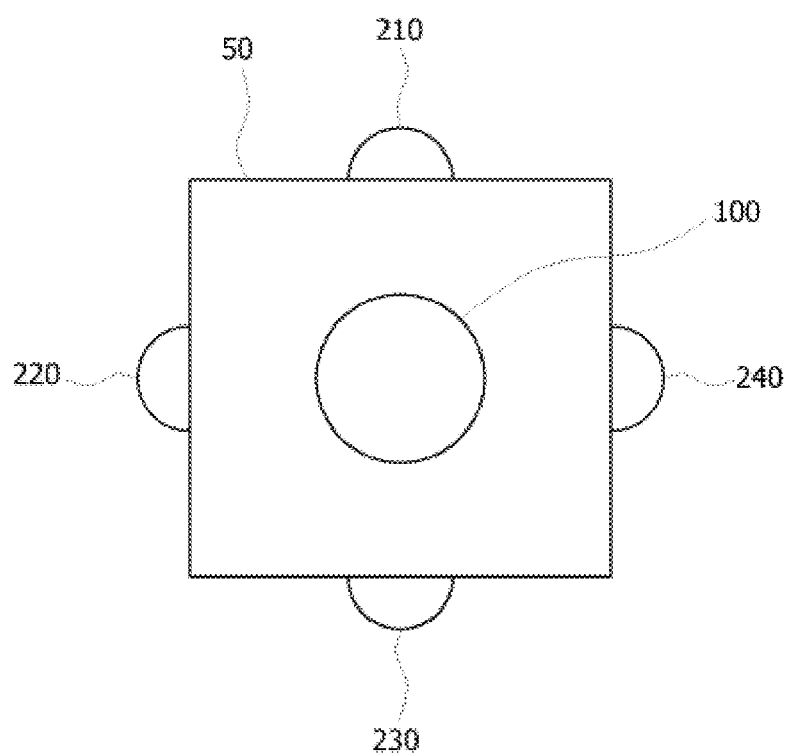
FIG. 2 is a plan view showing a LiDAR-camera synchronization device according to an embodiment of the present invention.

FIG. 1 is a perspective view showing a LiDAR-camera synchronization device according to an embodiment of the present invention. FIG. 2 is a plan view showing a LiDAR-camera synchronization device according to an embodiment of the present invention. The outer appearance of the LiDAR-camera synchronization device will be described with reference to FIGS. 1 and 2.

The LiDAR-camera synchronization device shown in FIGS. 1 to 2 is only an example according to an embodiment of the present invention, and is not limited thereto.

Referring to FIGS. 1 to 2, the LiDAR-camera synchronization device 10 according to an embodiment of the present invention may include a LiDAR 100, cameras 210, 220, 230, and 240, and a main body 50.

The LiDAR 100 may include a transmitter and a receiver. The transmitter emits light pulses towards the environment surrounding the LiDAR. The receiver detects reflections of the emitted light pulses. The LiDAR 100 may output point cloud data measuring the distance to the objects located in the surrounding environment by emitting and receiving light pulses to and from the surrounding environment while rotating.

The main body 50 may be equipped with the LiDAR 100 and the cameras 210, 220, 230, and 240. A synchronization control unit for controlling the LiDAR 100 and the cameras 210, 220, 230, and 240 may be additionally mounted inside the main body 50.

The cameras 210, 220, 230, and 240 may include at least one camera. In the present invention, four cameras are shown for convenience of explanation, but the number of cameras is not limited thereto.

Each of the cameras included in the cameras 210, 220, 230, and 240 may be disposed in the main body 50 to be spaced apart from each other at regular intervals. As shown in FIG. 2, each of the cameras included in the cameras 210, 220, 230, and 240 may be disposed on each side with an interval of 90 degrees, but this is only an example and is not limited thereto.

The device using the LiDAR 100 may include four to eight cameras of the same type arranged at regular intervals in the shape of a circle in order to capture all 360-degree images. Alternatively, the device using the LiDAR 100 may include different types of cameras to acquire special images such as thermal images.

The cameras 210, 220, 230, and 240 may include any one among a color camera, a near infrared (NIR) camera, a short wavelength infrared (SWIR) camera, and a long wavelength infrared (LWIR) camera.

Figure 3:
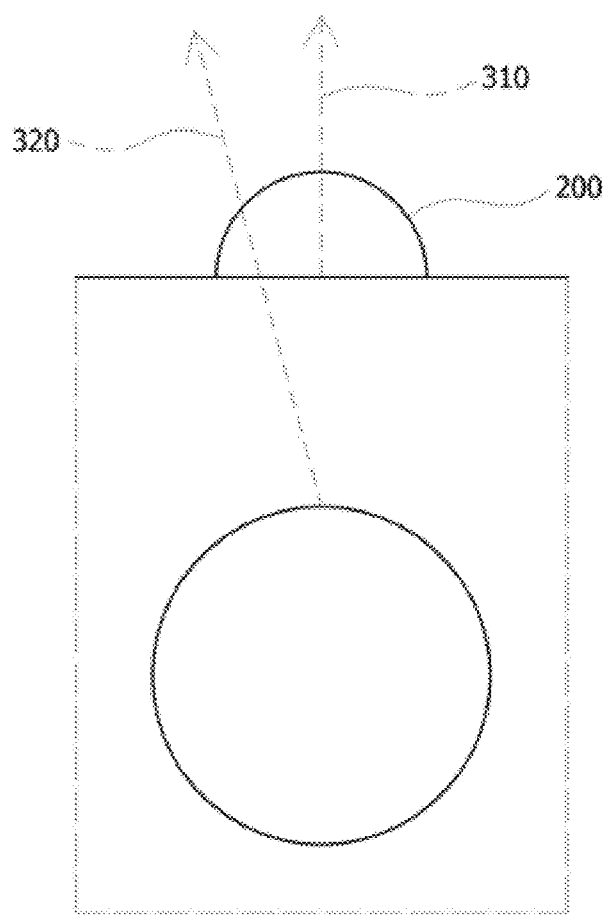
FIG. 3 is an exemplary view for comparing the centerline of the angle of view of a LiDAR with the centerline of the angle of view of a camera according to an embodiment of the present invention.

FIG. 3 is an exemplary view for comparing the centerline of the angle of view of a LiDAR with the centerline of the angle of view of a camera according to an embodiment of the present invention.

Referring to FIG. 3, for convenience of explanation, the center line of the angle of view of the camera 200 is referred to as a first center line 310, and the center line of the angle of view of the LiDAR 100 is referred to as a second center line 320.

The LiDAR 100 may photograph point clouds and output point cloud data while rotating, and the camera 200 may output image data. When the output point cloud data and the image data are merged while the LiDAR 100 faces the direction of the second center line 320 and the camera 200 faces the direction of the first center line 310, an error may occur. For example, when an artificial intelligence learning system attempts to identify an object from the merged image, the probability of identification failure may increase according to a mismatch between color information and distance information of the object.

To solve this problem, output data of the LiDAR 100 and the camera 200 should be merged when the first center line 310 and the second center line 320 match. Although the LiDAR 100 is set to rotate at a constant angular velocity, the angular velocity may have an error in an actual environment. Accordingly, when the shooting time of the camera 200 is determined by calculating a time point when the center of the angle of view of the LiDAR 100 matches that of the camera 200 in advance on the assumption that the angular velocity is constant, an error may occur as shown in FIG. 3.

Figure 4:
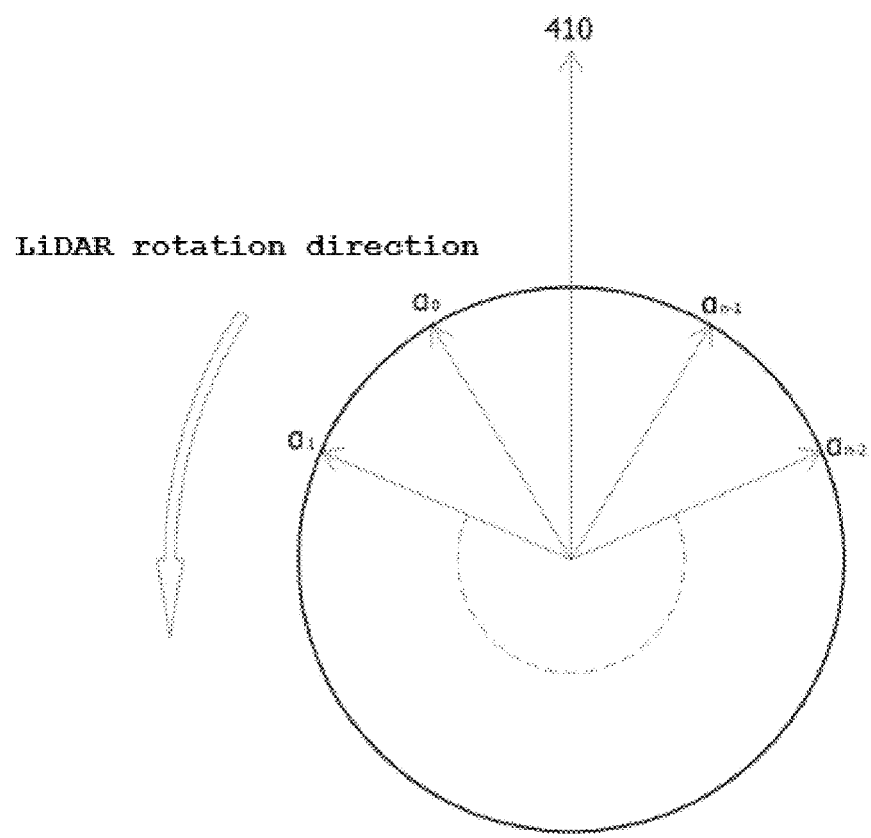
FIG. 4 is an exemplary view for explaining a method of calculating a trigger timing according to rotation of a LiDAR according to an embodiment of the present invention.

FIG. 4 is an exemplary view for explaining a method of calculating a trigger timing according to rotation of a LiDAR according to an embodiment of the present invention.

For convenience of explanation, in the present invention, a trigger target is defined as indicating a virtual direction in which the center of the angle of view of the LiDAR 100 matches that of the camera 200, and the trigger timing is defined as indicating a time estimated for the LiDAR 100 to rotate from the current position to the trigger target. In addition, a signal indicating start of shooting transmitted to the camera 200 is defined as a trigger signal.

For convenience of explanation, FIG. 4 is view showing an example for explaining a method of synchronizing signals of a LiDAR and a camera in a device provided with one camera. In the device provided with one camera, the LiDAR repeatedly rotates between the trigger target and the same trigger target.

The LiDAR 100 may output a sample including point cloud data of a constant cycle. This cycle is referred to as an output cycle ($T_{rload}$). The sample may include a rotation angle indicating the current position of the LiDAR 100. The rotation angle may indicate an angle of the LiDAR 100 rotated from the trigger target 410.

The rotation angle included in the sample output at the first cycle while the LiDAR 100 rotates using the trigger target 410 as the starting point is $a_0$, and the rotation angle included in the sample output at the next cycle is $a_1$, and the rotation angle included in the sample output at the n-th cycle is $a_{n-1}$.

An average value may be derived by dividing the sum of rotation angle differences of $a_0$ to $a_{n-1}$ by the number of samples (n). An average angular velocity w may be derived by dividing the average value by the output cycle $T_{rload}$. The formula for calculating the average angular velocity w is as follows.

$$\omega = \frac{\sum_{k=0}^{n-1} \frac{a_{k+1} - a_k}{n}}{T_{reload}}$$

An interposed angle, which is a difference between $a_{n-1}$ that is a rotation angle included in the most recently output sample and the angle of the trigger target 410, may be acquired. A value obtained by dividing the interposed angle by the derived average angular velocity w may be derived as a trigger timing. When the angle of the trigger target 410 is $a_{tr}$, the formula for obtaining the trigger timing $T_{tr}$ is as follows.

$$T_{tr} = \frac{a_{tr} - a_{n-1}}{\omega}$$

That is, a time that is taken to rotate and move from a point indicated by $a_{n-1}$ to the trigger target 410 may be derived as a trigger timing.

When the time of the trigger timing elapses, the LiDAR 100 is expected to be located at the trigger target 410. At this point, when a trigger signal is transmitted to the camera 200 and the camera 200 takes images, the output data of the LiDAR 100 and the image data of the camera 200 may be synchronized.

Figure 5:
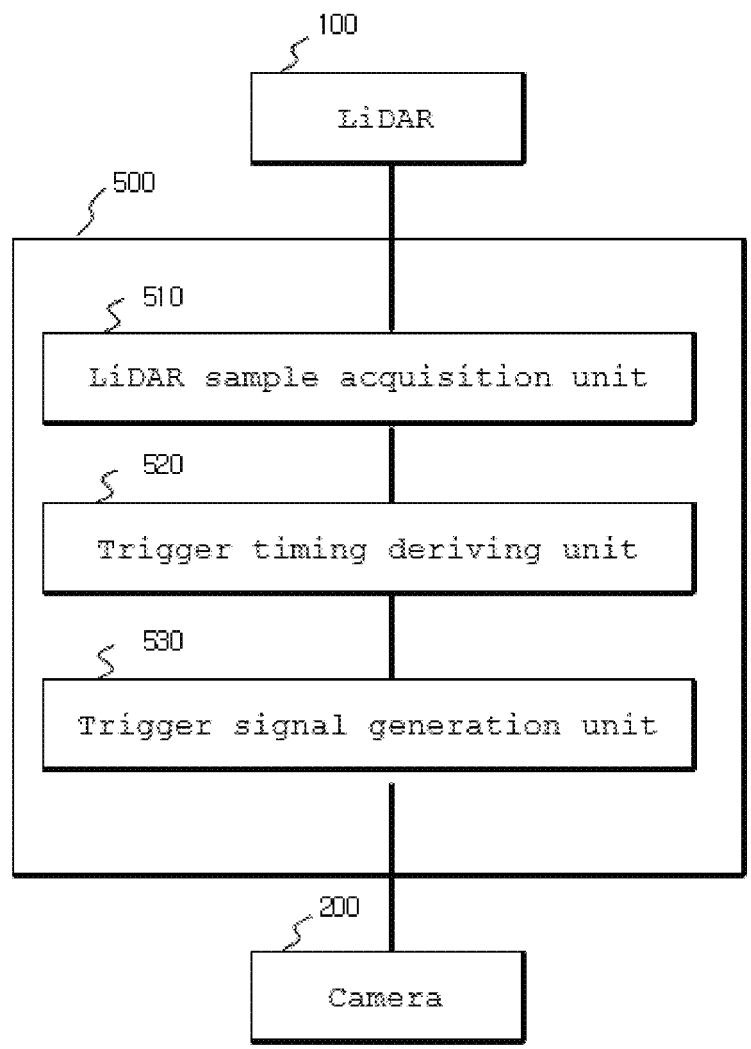
FIG. 5 is a block diagram showing the configuration of a LiDAR-camera synchronization device according to an embodiment of the present invention.

FIG. 5 is a block diagram showing the configuration of a LiDAR-camera synchronization device according to an embodiment of the present invention.

The LiDAR-camera synchronization device 10 may include a LiDAR 100, a synchronization control unit 500, and a camera 200.

The LiDAR 100 may output a sample including a rotation angle indicating the current position at every predetermined output cycle.

The synchronization control unit 500 may include a LiDAR sample acquisition unit 510, a trigger timing deriving unit 520, and a trigger signal generation unit 530.

The LiDAR sample acquisition unit 510 may acquire a sample that is output from the LiDAR 100, store the rotation angle included in the acquired sample in an internal storage, and update an acquired sample number indicating the number of acquired samples.

The LiDAR sample acquisition unit 510 may increase the acquired sample number by 1 whenever a new sample is acquired.

The LiDAR sample acquisition unit 510 may derive an average value by dividing a total sum of adding all difference values of the rotation angles included in the acquired sample and the previously acquired samples by the acquired sample number.

The LiDAR sample acquisition unit 510 may continue acquiring samples when the acquired sample number is smaller than a predetermined target sample number N.

The target sample number N may be determined according to the specifications of the LiDAR 100. It may be determined by the number of revolutions per second and the output cycle $T_{reload}$ of the LiDAR 100. The integer part of a value obtained by dividing the angular difference between the trigger targets by the product of the angular velocity and the output cycle $T_{reload}$ may be the target sample number N.

For example, when the number of revolutions per second is 10, the LiDAR rotates 3600 degrees per second, and the angular velocity is 3600/s. When the output cycle $T_{reload}$ is 0.01 second, the LiDAR may rotate and move 36 degrees, which is obtained by multiplying 3600 degrees and 0.01 seconds, at one output cycle $T_{reload}$, and when there is only one trigger target, the angular difference between the trigger targets is 360 degrees, and a value of 10 obtained by dividing 360 degrees by 36 degrees may be the target sample number N. When there is a plurality of trigger targets, a value obtained by dividing the angle between the trigger targets by 36 degrees obtained above may be the target sample number N.

The trigger timing deriving unit 520 may derive a value obtained by dividing the average value by the output cycle $T_{reload}$ as an average angular velocity when the acquired sample number is equal to the target sample number N.

The trigger timing deriving unit 520 may acquire an interposed angle, which is an angle difference between the point at which the LiDAR 100 has output a sample most recently and the trigger target. Referring to FIG. 4, the interposed angle is an angle difference between $a_{n-1}$ and the trigger target 410.

The trigger timing deriving unit 520 may derive a value obtained by dividing the interposed angle by the average angular velocity as a trigger timing.

The trigger signal generation unit 530 may transmit a trigger signal to the camera 200 when the time of the trigger timing elapses.

When the trigger signal is received, the camera 200 may begin capturing images and output image data.

Figure 6:
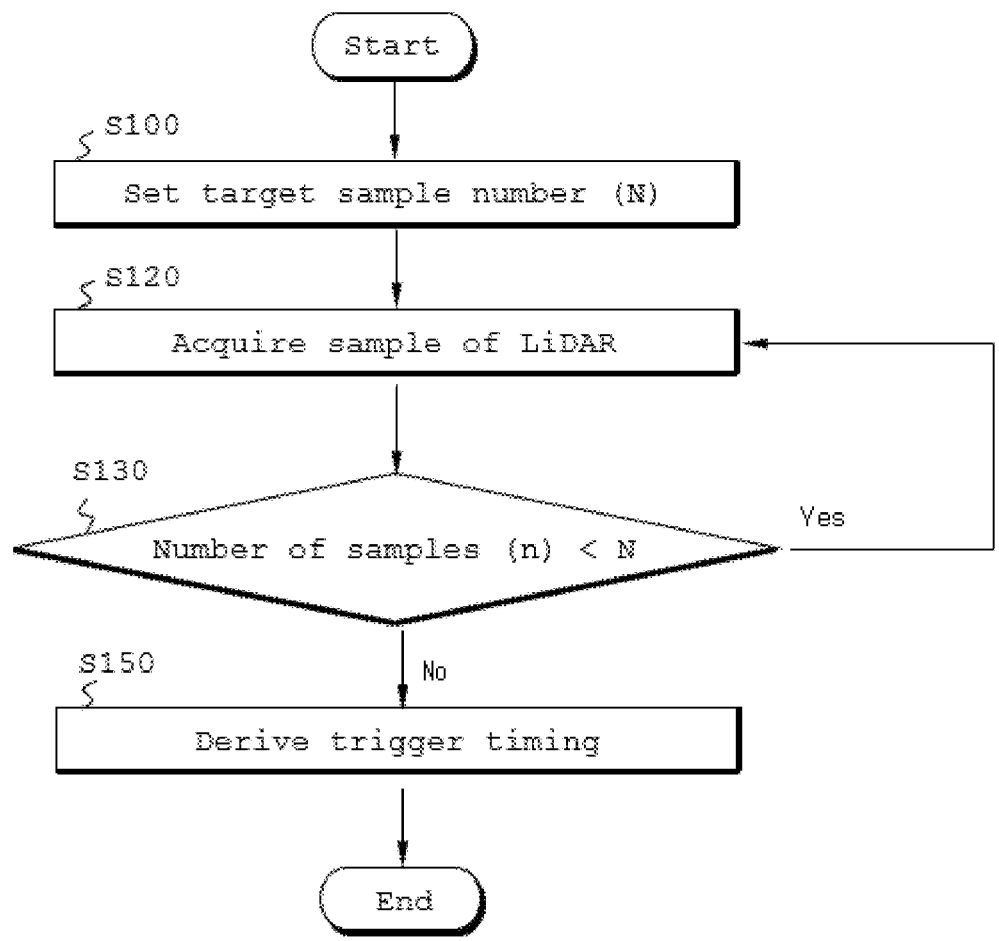
FIG. 6 is a flowchart illustrating a process of calculating a trigger timing in a method of synchronizing a LiDAR and a camera according to an embodiment of the present invention.

FIG. 6 is a flowchart illustrating a process of calculating a trigger timing in a method of synchronizing a LiDAR and a camera according to an embodiment of the present invention. A method of deriving a trigger timing will be described with reference to FIG. 6.

The synchronization control unit 500 sets a target sample number N (S100). The target sample number N may be determined according to the specifications of the LiDAR 100.

The synchronization control unit 500 acquires an output sample of the LiDAR 100 (S120). When the sample is acquired, the synchronization control unit 500 may increase the value of the acquired sample number indicating the number of previously acquired samples by 1, and derive an average value by dividing a total sum of adding all difference values of the rotation angles included in the acquired sample and the previously acquired samples by the acquired sample number.

When the acquired sample number is smaller than the target sample number N, the synchronization control unit 500 repeats the step (S120) of acquiring a sample (S130).

The synchronization control unit 500 derives a trigger timing when the acquired sample number is smaller than the target sample number N (S150). The synchronization control unit 500 may derive a value obtained by dividing the average value by the output cycle $T_{reload}$ as an average angular velocity, acquire an interposed angle, which is an angle difference between the point at which the LiDAR 100 has output a sample most recently and the trigger target, and derive a value obtained by dividing the interposed angle by the derived average angular velocity as a trigger timing.

Figure 7:
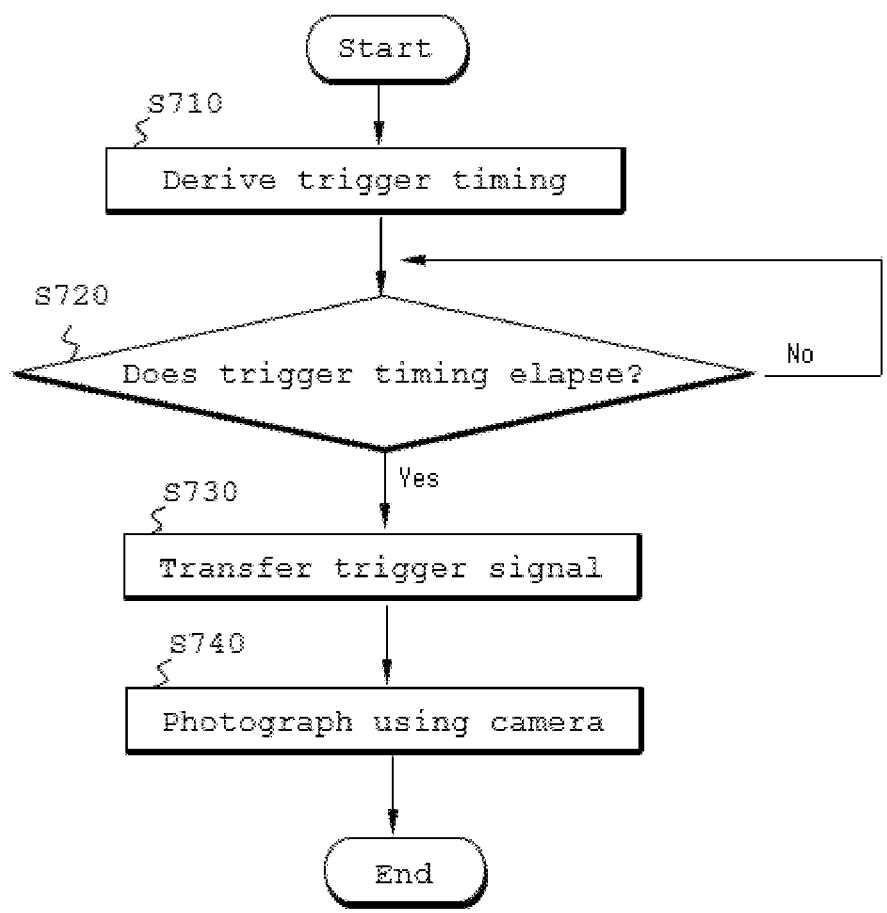
FIG. 7 is a flowchart illustrating a method of photographing with a camera using a method of synchronizing a LiDAR and a camera according to an embodiment of the present invention.

FIG. 7 is a flowchart illustrating a method of photographing with a camera using a method of synchronizing a LiDAR and a camera according to an embodiment of the present invention. The method will be described from the step of deriving a trigger timing to the step of photographing with a camera with reference to FIG. 7.

The synchronization control unit 500 derives a trigger timing (S710). The trigger timing may be derived by the method described with reference to FIG. 6.

The synchronization control unit 500 waits when the trigger timing has not elapsed (S720).

When the trigger timing elapses, the synchronization controller 500 transfers a trigger signal to the camera 200 (S730). The trigger signal may be transmitted from the synchronization control unit 500 to the camera 200 through a transmission line.

When the trigger signal is received, the camera 200 begins photographing with the camera (S740).

Figure 8:
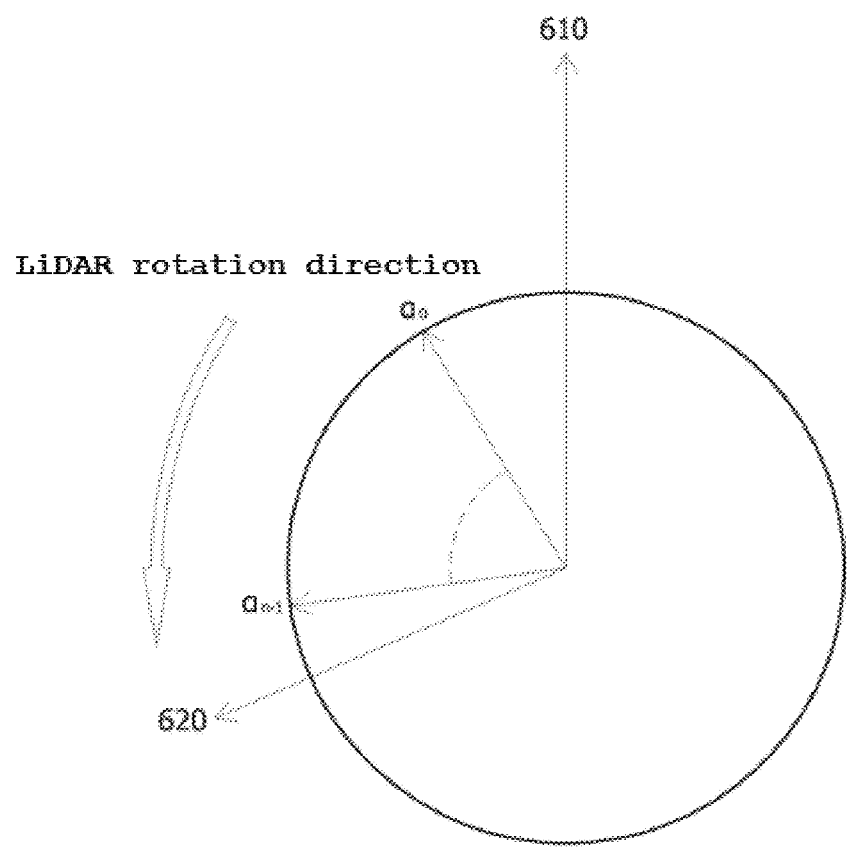
FIG. 8 is an exemplary view for explaining a method of calculating a trigger timing in a LiDAR-camera synchronization device including a plurality of cameras according to an embodiment of the present invention.

FIG. 8 is an exemplary view for explaining a method of calculating a trigger timing in a LiDAR-camera synchronization device including a plurality of cameras according to an embodiment of the present invention.

Referring to FIG. 8, the LiDAR-camera synchronization device 10 may include a first camera and a second camera. A virtual direction in which the center of the angle of view of the LiDAR 100 matches that of the first camera is a first trigger target 610, and a virtual direction in which the center of the angle of view of the LiDAR 100 matches that of the second camera is a second trigger target 620

The first camera and the second camera may be disposed at regular intervals.

The LiDAR 100 may output a sample at every output cycle $T_{reload}$ while rotating in the direction from the first trigger target 410 to the second trigger target 410. The sample may include a rotation angle indicating the current position of the LiDAR, and the rotation angle may indicate an angle of the LiDAR 100 rotated from the first trigger target 410.

When the sample is acquired, the synchronization control unit 500 may increase the value of the acquired sample number indicating the number of previously acquired samples by 1, derive an average value by dividing a total sum of adding all difference values of the rotation angles included in the acquired sample and the previously acquired samples by the acquired sample number, derive a value obtained by dividing the average value by the output cycle $T_{reload}$ as an average angular velocity when the acquired sample number is equal to the target sample number N, acquire an interposed angle, which is an angle difference between the rotation angle included in the sample that the LiDAR 100 has output most recently and the second trigger target 410, and derive a value obtained by dividing the interposed angle by the average angular velocity as a trigger timing.

Figure 9:
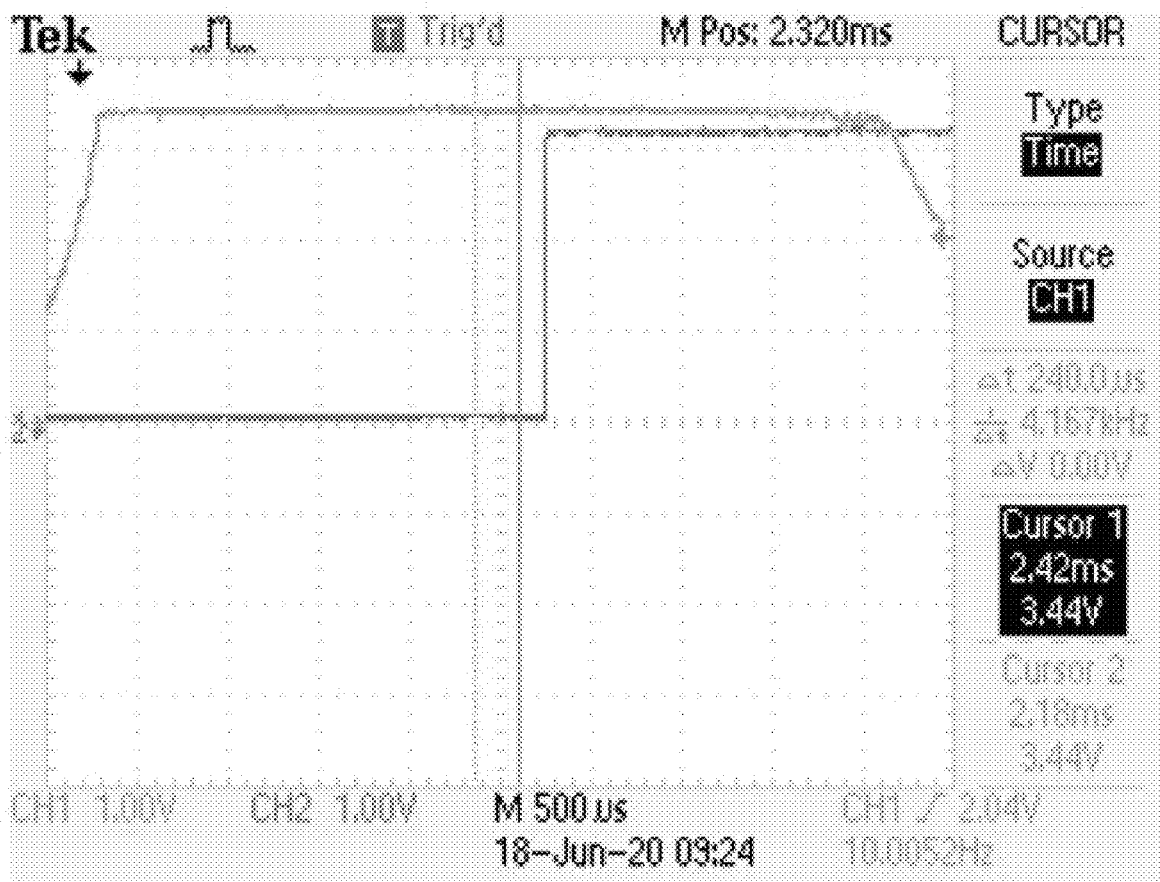
FIG. 9 is a view showing an experiment result of a LiDAR-camera synchronization device according to an embodiment of the present invention.

FIG. 9 is a view showing an experiment result of a LiDAR-camera synchronization device according to an embodiment of the present invention.

The graph shown in FIG. 9 is a screenshot of an oscilloscope screen recording a signal (yellow) of the light pulse emitted from the LiDAR 100 and received through a photo diode, and a trigger signal (blue) output from the synchronization control unit 500.

Referring to the graph of FIG. 9, the yellow dotted line indicates a time point when the LiDAR 100 is positioned at the trigger target 410, and it is recorded that a trigger signal is output after about 240 µs elapses from the yellow dotted line. It may be regarded that the synchronization method according to an embodiment of the present invention has an error of about 240 µs, and this error may be regarded as a very high synchronization effect.

Figure 10:
FIG. 10 is a view showing a picture produced by synthesizing sensing data and image data output by synchronizing a LiDAR and a camera according to an embodiment of the present invention.

FIG. 10 is a view showing a picture produced by synthesizing sensing data and image data output by synchronizing a LiDAR and a camera according to an embodiment of the present invention.

Referring to FIG. 10, it shows that the point cloud sensed by the LiDAR 100 is highly synchronized with the image data by the synchronization method according to an embodiment of the present invention.

According to the present invention as described above, there is an effect of predicting a moment when the LiDAR and the photographing direction of the camera match by measuring the rotation angular velocity of the rotary LiDAR in real-time.

In addition, according to the present invention as described above, there is an effect of matching the sensing data of the LiDAR and the image data of the camera by transmitting a trigger signal to the camera at the moment when the LiDAR and the photographing direction of the camera match.

Although the embodiments of the present invention have been described above with reference to the accompanying drawings, those skilled in the art may understand that the present invention can be embodied in other specific forms without changing the technical spirit or essential features thereof. Therefore, it should be understood that the embodiments described above are illustrative in all respects and not restrictive.

"This work is supported by the Korea Agency for Infrastructure Technology Advancement (KAIA) grant funded by the Ministry of Land, Infrastructure and Transport (Grant 21AMDP-C160637-01)."

What is claimed is:

1. A method of synchronizing a Light Detection and Ranging (LiDAR) and a camera in a synchronization device including the LiDAR, the camera, and a synchronization control unit, the method comprising:
    outputting a sample at every predetermined output cycle while rotating, by the LiDAR;
    deriving a trigger timing that is a time estimated for the LiDAR to rotate from a current position to a trigger target on the basis of the sample, by the synchronization control unit; and
    outputting a trigger signal to the camera after a time indicated by the trigger timing elapses, by the synchronization control unit,
    wherein the sample includes a rotation angle indicating the current position of the LiDAR,
    wherein the trigger target indicates a virtual direction in which a center of an angle of view of the LiDAR matches that of the camera,
    wherein the deriving the trigger timing includes:
    acquiring the output sample, by the synchronization control unit;
    increasing a value of an acquired sample number indicating the number of previously acquired samples by 1, by the synchronization control unit;
    deriving an average value by dividing a total sum of adding all difference values of rotation angles included in the acquired sample and the previously acquired samples by the acquired sample number, by the synchronization control unit;
    repeating acquiring a sample when the acquired sample number is smaller than a predetermined target sample number, by the synchronization control unit; and
    deriving the trigger timing on a basis of the average value when the acquired sample number is equal to the target sample number.

2. The method according to claim 1, wherein the rotation angle indicates an angle of the LiDAR rotated from the trigger target.

3. The method according to claim 1, wherein the deriving the trigger timing on the basis of the average value includes:

deriving a value obtained by dividing the average value by the output cycle as an average angular velocity, by the synchronization control unit;

acquiring an interposed angle, which is an angle difference between the rotation angle included in the most recently acquired sample and the trigger target, by the synchronization control unit; and deriving a value obtained by dividing the interposed angle by the average angular velocity as the trigger timing, by the synchronization control unit.

4. The method according to claim 1, wherein the camera includes at least one of a color camera, a near infrared (NIR) camera, a short wavelength infrared (SWIR) camera, and a long wavelength infrared (LWIR) camera.

5. A method of synchronizing signals of a LiDAR and a camera in a synchronization device including the LiDAR, a first camera, a second camera, and a synchronization control unit, the method comprising:

outputting a sample at every predetermined output cycle while rotating in a direction from a first trigger target to a second trigger target, by the LiDAR;

deriving a trigger timing that is a time estimated for the LiDAR to rotate from a current position to the second trigger target on the basis of the sample, by the synchronization control unit; and outputting a trigger signal to the second camera after a time indicated by the trigger timing elapses, by the synchronization control unit, wherein the sample includes a rotation angle indicating the current position of the LiDAR, and the first trigger target is a virtual direction in which a center of an angle of view of the LiDAR matches that of the first camera, and the second trigger target is a virtual direction in which a center of an angle of view of the LiDAR matches that of the second camera, wherein the deriving the trigger timing includes:

acquiring the output sample, by the synchronization control unit;

increasing a value of an acquired sample number indicating the number of previously acquired samples by 1, by the synchronization control unit;

acquiring an average value by dividing a total sum of adding all difference values of rotation angles included in the acquired sample and the previously acquired samples by the acquired sample number, by the synchronization control unit;

repeating acquiring a sample when the acquired sample number is smaller than a predetermined target sample number, by the synchronization control unit;

deriving a value obtained by dividing the average value by the output cycle as an average angular velocity, by the synchronization control unit;

acquiring an interposed angle, which is an angle difference between the rotation angle included in the most recently acquired sample and the second trigger target, by the synchronization control unit; and deriving a value obtained by dividing the interposed angle by the average angular velocity as the trigger timing, by the synchronization control unit.

6. The method according to claim 5, wherein the rotation angle indicates an angle of the LiDAR rotated from the first trigger target.

7. A LiDAR-camera synchronization device comprising:

a camera;

a LiDAR for outputting a sample at every predetermined output cycle; and a synchronization control unit for acquiring the sample, deriving a trigger timing that is a time estimated for the LiDAR to rotate from a current position to a trigger target on the basis of the sample, and outputting a trigger signal to the camera after a time indicated by the trigger timing elapses, wherein the sample includes a rotation angle of the LiDAR rotated from a point where the LiDAR has output an immediately previous sample, the trigger target is a virtual direction in which a center of an angle of view of the LiDAR matches that of the camera, and when the sample is acquired, the synchronization control unit increases a value of an acquired sample number indicating the number of previously acquired samples by 1, derives an average value by dividing a total sum of adding all difference values of rotation angles included in the acquired sample and the previously acquired samples by the acquired sample number, derives a value obtained by dividing the average value by the output cycle as an average angular velocity when the acquired sample number is equal to the target sample number, acquires an interposed angle, which is an angle difference between the rotation angle included in the sample that the LiDAR has output most recently and the trigger target, and derives a value obtained by dividing the interposed angle by the average angular velocity as the trigger timing.

8. A LiDAR-camera synchronization device comprising:

a first camera;

a second camera disposed at a predetermined distance from the first camera;

a LiDAR for outputting a sample at every predetermined output cycle while rotating in a direction from a first trigger target to a second trigger target; and a synchronization control unit for acquiring the sample, deriving a trigger timing that is a time estimated for the LiDAR to rotate from a current position to a second trigger target on the basis of the sample, and outputting a trigger signal to the second camera after a time indicated by the trigger timing elapses, wherein the sample includes a rotation angle indicating the current position of the LiDAR, the rotation angle indicates an angle of the LiDAR rotated from the first trigger target, the first trigger target is a virtual direction in which a center of an angle of view of the LiDAR matches that of the first camera, the second trigger target is a virtual direction in which a center of an angle of view of the LiDAR matches that of the second camera, and when the sample is acquired, the synchronization control unit increases a value of an acquired sample number indicating the number of previously acquired samples by 1, derives an average value by dividing a total sum of adding all difference values of rotation angles included in the acquired sample and the previously acquired samples by the acquired sample number, derives a value obtained by dividing the average value by the output cycle as an average angular velocity when the acquired sample number is equal to the target sample number, acquires an interposed angle, which is an angle difference between the rotation angle included in the sample that the LiDAR has output most recently and the second trigger target, and derives a value obtained by dividing the interposed angle by the average angular velocity as the trigger timing.

* * * * *